United States Patent [19]

Revankar

[11] Patent Number: 5,649,025
[45] Date of Patent: Jul. 15, 1997

[54] MULTITHRESHOLDING FOR DOCUMENT IMAGE SEGMENTATION

[75] Inventor: Shriram V. S. Revankar, Penfield, N.Y.

[73] Assignee: Xerox Corporation, Stamford, Conn.

[21] Appl. No.: 383,330

[22] Filed: Feb. 3, 1995

[51] Int. Cl.$^6$ ..................................................... G06T 5/40
[52] U.S. Cl. ........................... 382/171; 382/270; 358/466
[58] Field of Search .................................... 382/168, 170, 382/199, 200, 171, 172, 270, 271, 161, 282, 272, 273, 173, 176; 358/465, 466, 464, 467

[56] References Cited

U.S. PATENT DOCUMENTS

| | | | |
|---|---|---|---|
| 4,556,916 | 12/1985 | Matsunawa | 358/282 |
| 5,351,313 | 9/1994 | Bessho et al. | 382/51 |
| 5,481,620 | 1/1996 | Vaidyanathan | 382/169 |

OTHER PUBLICATIONS

"Threshold Selection Using Second Derivatives of the Gray Scale Image," Pavlidis, Document Analysis, 1993 International Conference pp. 274–277, 1993.

M.A. Sid–Ahmed; "A Hardware Structure for the Automatic Selection of Multi–Level Thresholds in Digital Images"; Pattern Recognition, 25(12):1517–1528, 1992.

J. Kittler & J. Illingworth; "On Threshold Selection Using Clustering Criteria"; IEEE Transactions on Systems, Man and Cybernetics, SMC–15(5):652–655, 1985.

Han Lee & Rae–Hong Park; comments on "An Optimal Threshold Scheme for Image Segmentation"; IEEE Transactions on Systems, Man and Cybernetics, 20(3):741–742, May/Jun. 1990.

Sang Uk Lee & Seok Yoon Chung; "A Comparative Performance Study of Several Global Thresholding Techniques for Segmentation"; Computer Vision, Graphics and Image Processing, 52:171–190, 1990.

Wen–Hsiang Tsai; "Moment–Preserving Thresholding: A New Approach"; Computer Vision, Graphics and Image Processing, 29:377–393, 1985.

S. Boukharouba, M. Rebordao & P.L. Webdel; "An Amplitude Segmentation Method Based on the Distribution Function of an Image"; Computer Vision, Graphics and Image Processing, 29:47–59, 1985.

Ibrahim Sezan; "A Peak Detection Algorithm and its Application to Histogram–Based Image Data Reduction"; Computer Vision, Graphics and Image Processing, 49:36–51, 1990.

Shyun Wang & Robert Haralick; "Automatic Multithreshold Selection"; Computer Vision, Graphics and Image Processing, 25:46–67, 1984.

Lois Hertz & Ronald Schafer; "Multilevel Thresholding Using Edge Matching"; Computer Vision Graphics and Image Processing, 44:279–295, 1988.

Joan Weszka & Azriel Rosenfeld; "Histogram Modification for Threshold Selection", IEEE Transactions on Systems, Man and Cyvbernetics, SMC–9(1):38–52, 1979.

Sahoo et al., "A Survey of Thresholding Techniques", *Computer Vision, Graphics, and Image Processing*, vol. 41, pp. 233–260 (1988).

Reddi et al. "An Optimal Multiple Threshold Scheme for Image Segmentation", *IEEE Transactions on System Man, and Cybernetics*, SMC–14(4), pp. 661–665, (1984).

(List continued on next page.)

*Primary Examiner*—Michael T. Razavi
*Assistant Examiner*—Larry J. Prikockis
*Attorney, Agent, or Firm*—Mark Costello

[57] ABSTRACT

An image processing method for preparing a document for printing or other further processing. Document images often contain information in several intensity levels. Detecting these levels will help separate logically separate regions in the image. A multithresholding process separates different significant intensity levels in a document image by recursively finding locally optimum threshold locations, and then selecting only the significant thresholds by studying the intensity transitions in the image.

3 Claims, 6 Drawing Sheets

OTHER PUBLICATIONS

Otsu, "A Threshold Selection Method from Gray-Level Histograms", *IEEE Transactions on System, Man, and Cybernetics,* SMC–9(1) pp. 62–66 (1979).

Lawrence O'Gorman, "Binarization and Multi-Thresholding of Document Images Using Connectivity", University of Nevada, Las Vegas Annual Symposium of Document Analysis & Information Retrieval, (Apr. 1994).

MULTITHRESHOLDING FOR DOCUMENT IMAGE SEGMENTATION

This invention relates to a process for thresholding signals preparatory to further processing, and more particularly to a process of recursively finding locally optimum threshold locations, and selecting only the significant thresholds by studying the intensity transitions in the image.

BACKGROUND OF THE INVENTION

In the digital reproduction of documents (color, or black and white), an image is conveniently represented as a bitmap or combination of bitmaps, which may be described as an electronic image with discrete signals (hereinafter, pixels) defined by position and density. In such a system, density is described as one level in a number of possible states or levels set or determined by the system. When more than two levels of density are used in the description of the image, the levels are often termed "gray", indicating that they vary between a maximum and minimum, and without reference to their actual color. Most printing systems, have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user.

In printing documents, the desired density over an area is sometimes achieved by "thresholding". Thresholding is a process of labeling pixels in an image by comparing their intensity values to a specified value called "threshold". In "multithresholding" a finite set of thresholds are specified, and the pixels are labeled depending on the value of the highest threshold value lower than its intensity value. Document image segmentation is a process of dividing a page image into regions that need distinctly different, but regionally uniform, further processing if recognition, compression or high quality printing is desired. For example, document recognition may need separation of components that are logically different, e.g. separation of text, graphics and pictures from the background, and high quality printing may need separation of components that were rendered differently, e.g., high frequency and low frequency halftone areas, contone areas and text areas from the background. These separations are often complementary, i.e., document contents that logically differ, are often rendered differently. Therefore segmentation done at the pixel level can be used for both printing and recognition tasks.

In one example, most optical character recognition (OCR) systems are fine tuned to recognize an input binary region as the character it matches the most. Hence, it is necessary to provide only those regions that are "characters" to OCR. Most OCR systems assume a two layered (sometimes, bimodal) document image model, usually black text on uniform white background. Quite often, in the case of images of modern documents, particularly those using color, this simple model is violated, and OCR systems either fail to recognize all the text on a page, or mis-recognize non character patterns as characters.

A large class of documents can be usefully segmented based on the intensity values of the pixels, because image contents are rendered at different levels of intensity. A different intensity or color is chosen to esthetically differentiate certain document contents from their surroundings. In a typical document, the number of intensity levels used for rendering different document components, is usually small, and at each intensity level a significant component of the document is rendered. In FIG. 1 an example of a documents with multiple intensity level renderings is provided. The example document image D of FIG. 1 which might be derived by scanning at an input scanner, has three dominant intensity levels. A first level contains the white background and the large white text, the second level is the light tinted background and the light text, and the third level contains the black text. The document image of FIG. 1 contains information in three intensity levels. It has text in two levels, i.e. in white and black, and the background is gray. In addition to these significant levels, a close observation of a real document would show variations in intensities within the levels due to normal, imperfect reproduction and scanning processes. A segmentation method should not be sensitive to such insignificant intensity variations.

In the absence of a priori knowledge of the rendered intensity levels, the main problem of segmentation is to find the significant intensity levels in an image at which different significant document content components are rendered. Once those intensity levels are known, one can segment the document into useful regions simply by labeling each pixel based only on its intensity value.

The document presented shows that a global thresholding process will render information-carrying regions of the document unusable. Accordingly, multiple thresholds applied to each region are desirable. Two basic assumptions about the document are made that describe the document, and simplify the problem i.e., 1) the number of levels of intensity used to differentiate the document content components are finite and small, and 2) at each chosen intensity level a significant area of the document is rendered uniformly. In other words we constrain the problem by assuming that a typical document image includes a few significant intensity levels, and that each intensity level of the image is relatively smooth without sharp intensity variations.

A document image satisfying these assumptions, will have well defined modes in its intensity histogram, as shown in FIG. 2. The histogram has peaks corresponding to each intensity level A, B and C from the document image of FIG. 1 and approximately zero values elsewhere (for simplicity, the FIG. 1, and accordingly FIG. 2 have been highly simplified and idealized). For such images, it is trivial to find the thresholds. Any threshold selected at a zero of the histogram between two non zero peaks would be an optimum threshold, and if there are n levels, the set of n-1 thresholds will optimally segment the image into its components. FIG. 2 shows the original image with three significant intensity levels and the results of thresholding at zero points between two successive well defined modes as shown in the histogram of the original image, illustrated by TCB and TBA. FIGS. 3A, 3B, and 3C show the thresholded document segments of the image are shown in the right.

However, that is not the case for real images. In a non ideal image, the optimum threshold points between significant modes cannot be detected using the trivial process described in the previous paragraph. For example, depending on system noise, there may be no zero points in the histogram. Furthermore, an automatic algorithm needs to find out the number of significant levels or prominent modes in the image to compute the optimum thresholds. If the number of modes or significant levels in a document image is known, one could use brute force statistical discriminant analysis for searching a given number of thresholds. If the used number of levels is wrong, the computed thresholds will fragment the image into unusable chunks. For an image of a bimodal document, discriminant analysis based method has been proposed. This approach has been evaluated to be one of the best for binary case, as shown in Sahoo et al., "A Survey of Thresholding Techniques", *Computer Vision, Graphics, and Image Processing*, Vol. 41, pages 233–260 (1988) and Reddi et al. "An Optimal Multiple Threshold Scheme for Image Segmentation, *IEEE Transactions on System Man, and Cybernetics,*" SMC-14(4), pages 661–665, (1984). The method is easily generalizable to multiple thresholding, if number of levels are known a priori, as shown in Otsu, "A Threshold Selection Method from Gray-Level Histograms", *IEEE Transactions on Systems, Man, and Cybernetics*, SMC-9(1) pages 62–66 (1979). This reference details the concept of "goodness". Goodness measure in the proposed thresholding method corresponds to statistical separability of the intensity distribution of the image on either side of the threshold. If there are two distributions that occur with probabilities p1 and p2, and their means are "d" distance apart, then the used measure of separability (goodness) is:

$$\text{goodness} = \frac{d^2\ (p_1, p_2)}{\text{total variance}}$$

This value is 1 when two distributions are perfectly separated, and it is zero if the distributions are not separated. There are several other separability measures described in the statistics literature. The above measure is computable from the first order statistics and therefore it is efficient to compute. Note also, "Binarization and Multi-Thresholding of Document Images Using Connectivity", by Lawrence O'Gorman, University of Nevada, Las Vegas Annual Symposium of Document Analysis & Information Retrieval, (April 1994).

References disclosed herein are incorporated by reference for their teachings.

SUMMARY OF THE INVENTION

In accordance with the invention, there is provided a document processing method to find the number of significant intensity levels and to select an optimum value between any two consecutive significant intensity levels that can be used to separate the document regions through multithresholding. A process is provided that for recursively finding locally optimum threshold locations, and selecting only the significant thresholds by studying the intensity transitions in the image. We will use a goodness measure that is a function of the above described goodness measure and local histogram differences.

The proposed segmentation lowers the complexity of a document image enormously for future processings such as image compression, printing, and recognition of the image text, pictures and graphics.

These and other aspects of the invention will become apparent from the following descriptions to illustrate a preferred embodiment of the invention read in conjunction with the accompanying drawings in which.

Figure 1:
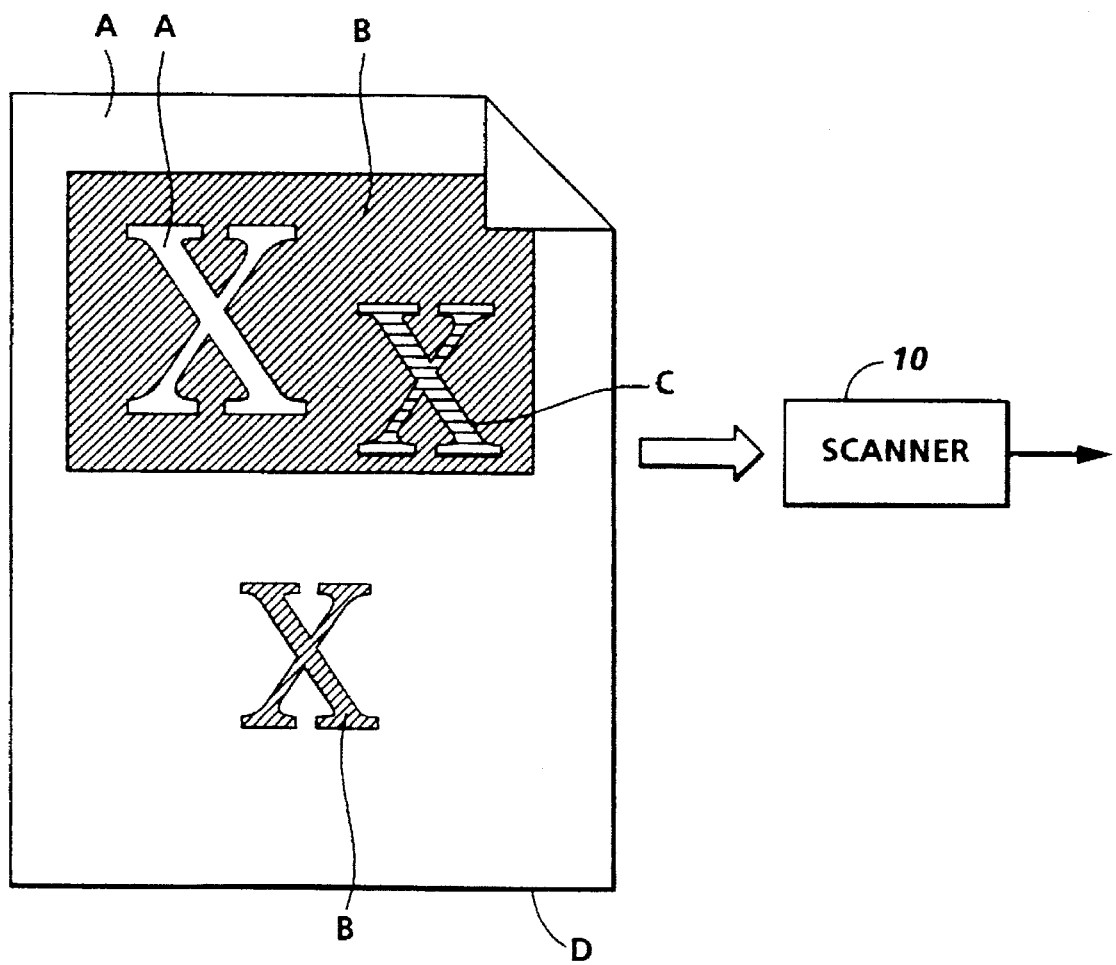
FIG. 1 represents an idealized example document requiring multithresholding.
Figure 2:
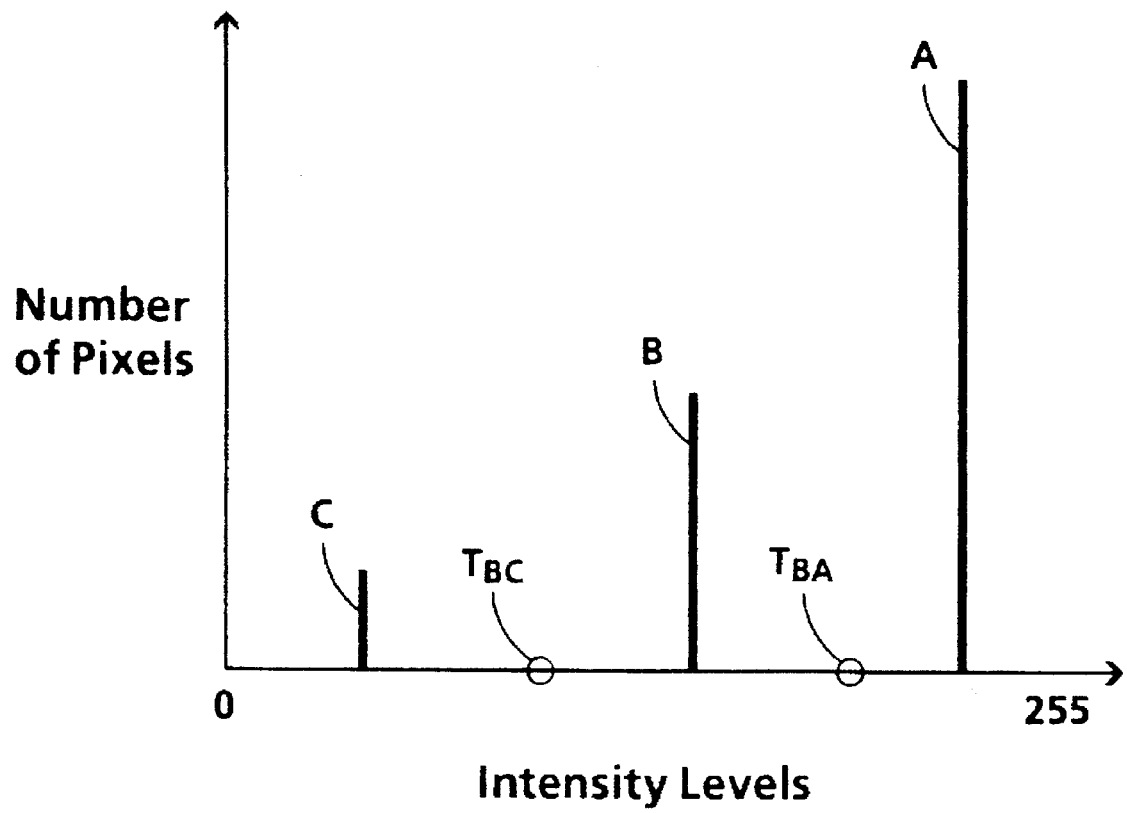
FIG. 2 is a histogram showing the distribution of intensity levels of FIG. 1.
Figure 3A:
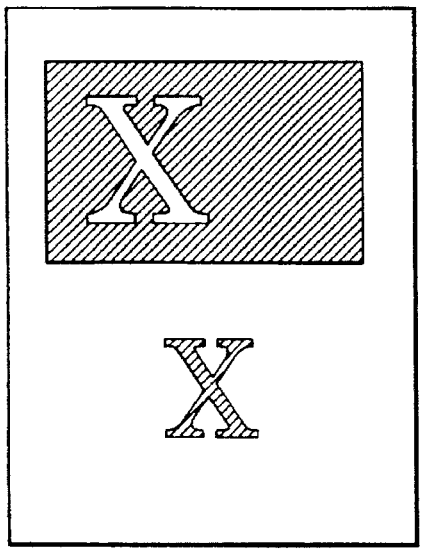
Figure 3B:
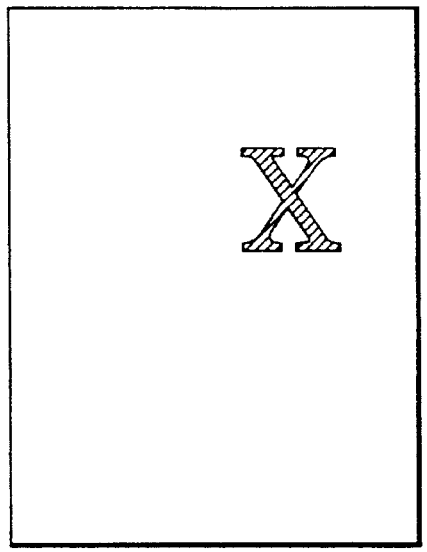
Figure 3C:
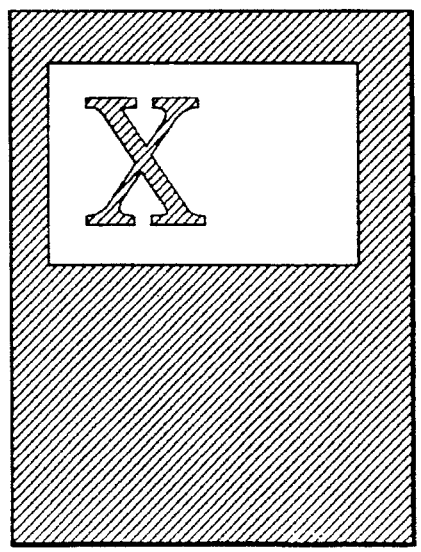
Figure 4:
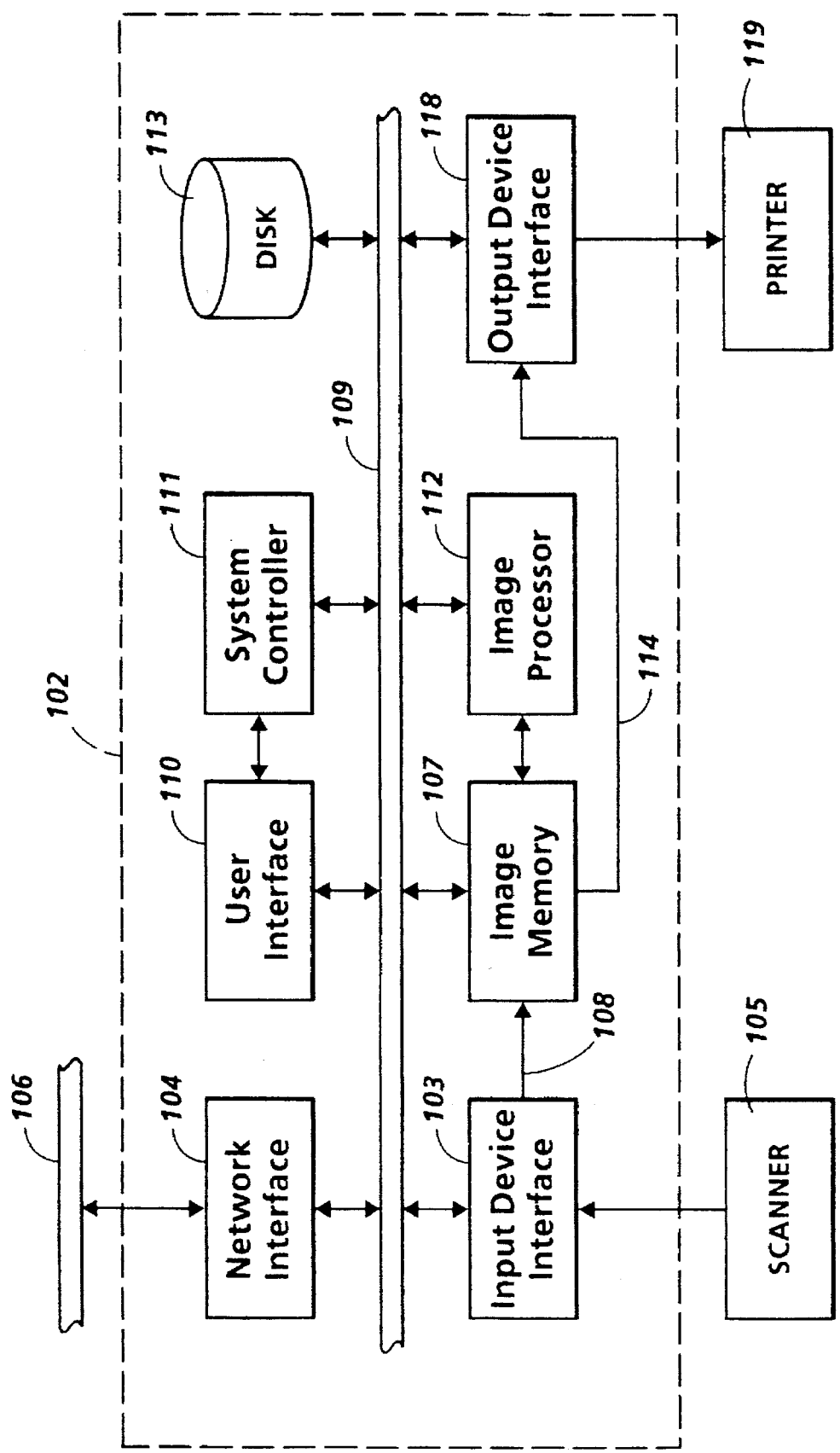
Figure 5:
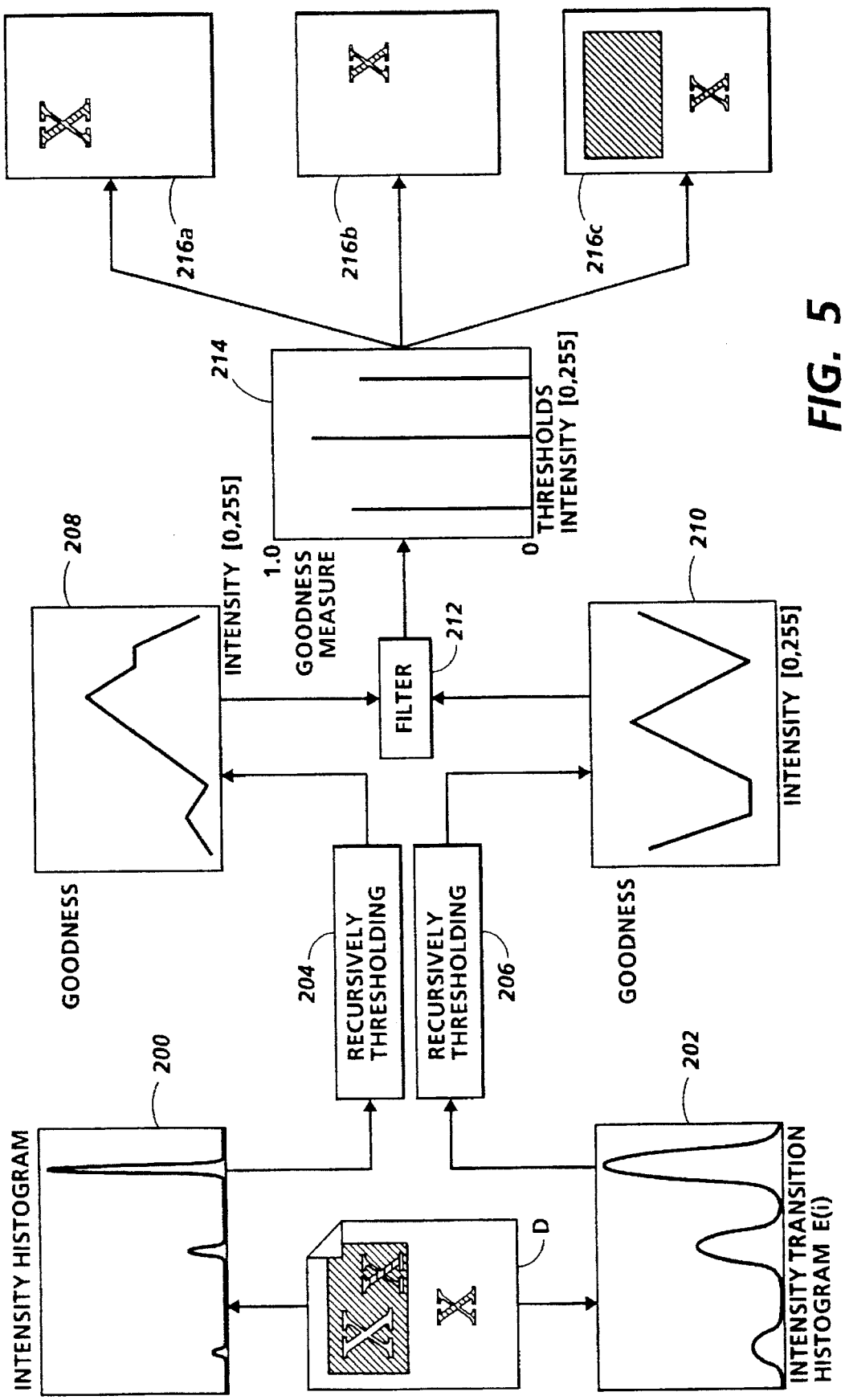

FIGS. 3A, 3B and 3C demonstrate the output of a simple multithresholding process;

FIG. 4 illustrates the basic components of a system in which the present invention may find use;

FIG. 5 illustrates the inventive process; and

Figure 6:
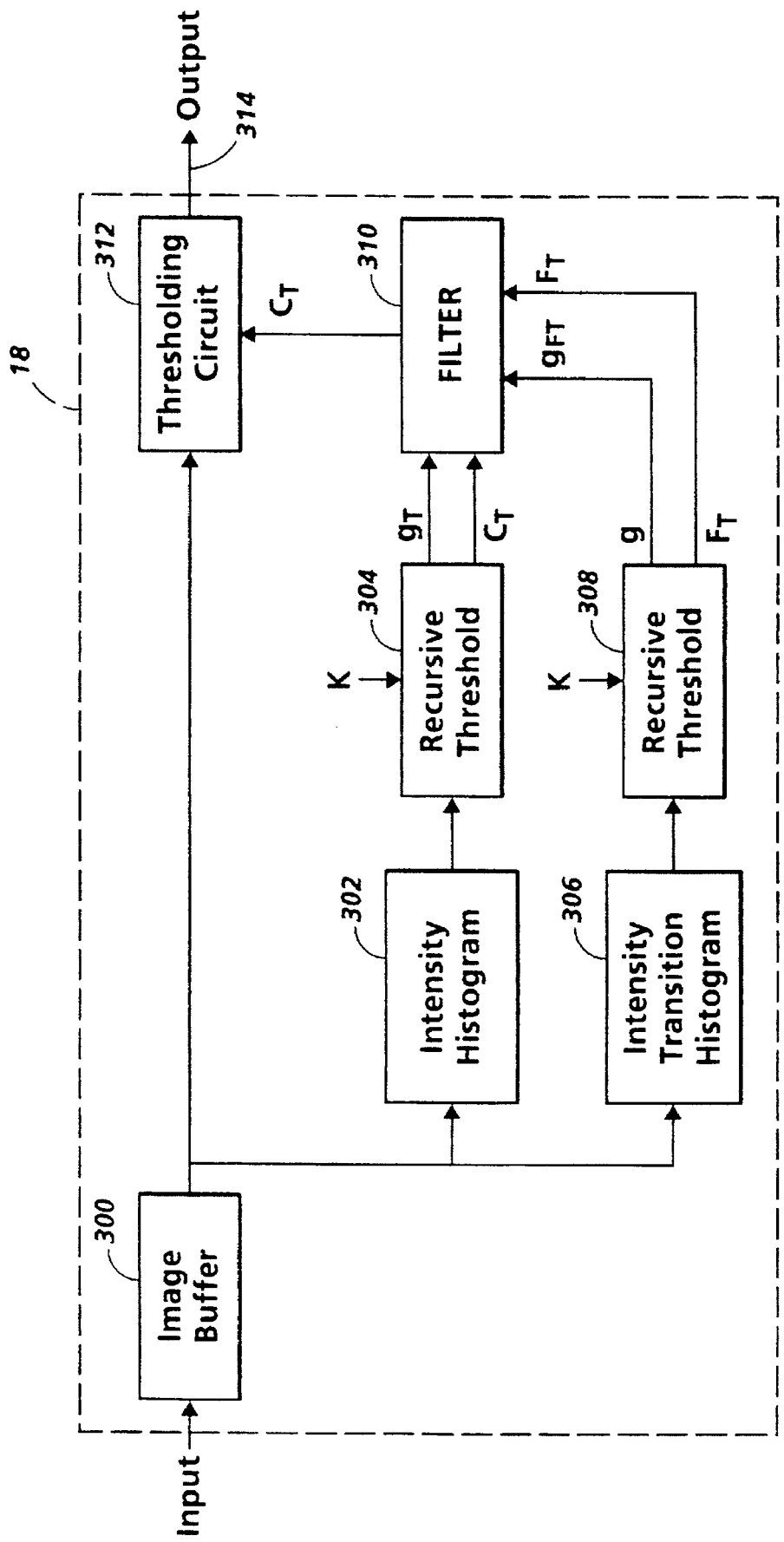

FIG. 6 is a functional block diagram illustrating an embodiment of the invention.

With reference now to the drawings, where the showings are for the purpose of illustrating an embodiment of the invention and not for limiting same, at FIG. 4, a generalized system is illustrated in which the present invention may find use. A basic document processing system is shown including a document processing system 102. The image processing system 102 receives image information either through input device interface 103 or network interface 104. In this embodiment, input device interface 103 is connected to scanner 105 which generates images I(x,y,d) having a defined width x, length y and number of density levels d. Common scanners, such, for example, the Pixelcraft 7650, produce 8 bit/pixel data, providing d-256, at resolutions acceptable for many purposes. Color images may be defined by a plurality of bitmaps. Alternatively, image information received through network interface 104 from network 106 can be transmitted from devices such as remote scanners, file server, etc. (not shown). Information received through network interface 104 may contain, in part or in full, image information in the form of raster images having a defined width, length and depth.

Once a raster image is received from scanner 105 by document processing system 102, image I(x,y,d) is transmitted to image memory 107 either through connection 108 or data bus 109 as directed by system controller 111. In the event image information is simultaneously received through interfaces 103 and 104, controller 111 routes image information from network 106 to secondary storage or hard disk 113 through data bus 109 and image information from input device or scanner 105 to primary storage or image memory 107 using connection 108. Once image information such as image I(x,y,d) is received and stored in memory 107, image processor 112 is invoked by controller 111 as programmed through user interface 110 which operates on a video display or the like. Subsequent to processing image I(x,y,d), the image stored in memory 107 is either reproduced on output device or printer 119 through connection 114 and output device interface 118 or transmitted to secondary storage 113 or a remote device connected to network 106 through data bus 109. This is but one example use of the inventive process, which may also be used to generate output for subsequent compression, recognition or image archival and retrieval processors.

Initially the process will be described. As noted, it is assumed that: 1) the number of levels of intensity used to differentiate the document content components are finite and small, and 2) at each chosen intensity level, a significant area of the document is rendered more or less uniformly. However the number of levels are unknown, so the following process is used to segment the image:

Step 1: Compute the image intensity histogram H[1 :L], where where $$H(i) = \sum_{x,y} eq(g(x,y), i)$$

$$eq(a,b) = 1 \text{ if}(a = b)$$
$$= 0 \text{ otherwise;}$$

-continued

L = the maximum number of levels in the image;

g(x,y) is the pixel intensity at a pixel at location (x,y).

Step 2: Use a discriminant analysis-based method to find a threshold $T_I$ for the histogram H, assuming that it is bimodal, and store the derived "goodness" value of the threshold $T_I$.

Step 3: Use threshold $T_I$ to divide the histogram into two sub histograms as in step 2 and find thresholds $T_{J1}$ and $T_{JN}$ for each sub histogram, and store the corresponding goodness values.

Step 4: Repeat step 3 for a constant k number of times. The value of k is determined empirically.

Step 5: Select the thresholds that have local maxima of goodness values. The set of thresholds CT obtained by the above process are the "candidate thresholds". If the input image satisfies the image assumption, the intensity transitions between the levels should be apparent. The number of significant transitions will be equal to the number of levels in the image. To estimate the transitions a histogram of the second or higher order positive norm of the transitions is obtained at each pixel.

Step 6: Compute the intensity transition histogram E[1 :L]

$$E(i) = \sum_{x,y} (g'^2(x,y)g(x,y),i)$$

$$g'(x,y) = \frac{1}{8} \left[ 9g(x,y) - \sum_{i,j=-1}^{1} g(x+i,y+i) \right]$$

where g'(x,y) is the pixel intensity gradient at location (x,y).

Step 7: Obtain a second set of threshold by subjecting this histogram to steps 2 through 5. This second set of thresholds, $F_T$, are the "filter thresholds".

Step 8: Find the number of significant levels m by finding the cardinality of the smaller of the two sets $C_T$ and $F_T$.

Step 9: Select top m thresholds from $C_T$ as the final thresholds based on their goodness values.

At each stage, a threshold is determined based on discriminant analysis that maximizes the goodness measure for the histogram. The greater the value, the better the detected threshold. For each threshold determined, the goodness measure is stored along with the corresponding threshold. If there are two thresholds that are closely adjacent to each other, and if it is necessary to select one of them for segmentation, the threshold with the higher goodness value is selected.

Significance of statistics and reliability of derived measures drop drastically as the sample size becomes small. In the proposed method, the histogram (original sample) is recursively cut into two pieces, and with each recursion smaller samples and less reliable thresholds are generated as the goodness measure becomes less reliable. Therefore, for the sake of reliability, each histogram is cut as few times as possible. On the other hand it is necessary to cut the histogram at least as many times as the number of significant levels in the document, and that number is not known a priori. For a typical document, the constant k-4, i.e., we determined 7 thresholds that cut the histogram into 8 pieces. This maintains acceptable sample size for a 100 dpi or higher resolution page image. Furthermore, this agrees with the observation that documents usually have 2 or 3 levels and sometimes 4 levels, i.e. we need at most 3 thresholds out of 7 computed thresholds. In general, the constant value k should be greater than the number of levels in the document.

Clearly, a user could guess at the number to enter the value through a user interface and assist the process in this determination.

The intensity transition histogram is a mapping of the population of changes in intensity between pixels. Thus, at an edge in the image, which is typically part of text or other information carrying content in an image, there may be a differences or "intensity transitions" represented by white to black changes (256 levels), gray to white changes (perhaps 150 levels), gray to gray changes (perhaps 50 levels) or gray to black changes (perhaps 150 levels). It should be clear the edges of information should be relatively common through the image, and therefore represented by relatively high values in the histogram. Background, on the other hand, should be represented as a relatively large number of small transition values. Note that the intensity transition histogram function used in this embodiment utilizes a second power function. This addition to the function is desirable to minimize background noise effects. Without it, the background looks like a significant value.

FIG. 5 shows the various steps involved in the method, and the corresponding results obtained for a multi-level document image. Two different histograms of the document image D are obtained, an intensity histogram 200 and an intensity transition histogram 202 (neither histogram is accurate, but they illustrate the concept). Each histogram is recursively thresholded at process 204, 206 using discriminant analysis-based method, and the goodness values of the thresholds are stored along with the thresholds. The graphs 208 and 210 respectively illustrate the goodness function for each histogram, and show the local maxima of goodness values (1, 2 and 3). The thresholds of intensity histogram H(i) correspond to the local maxima of goodness values from the candidate thresholds. The thresholds of transition histogram E(i) corresponding to the local maxima of goodness values (4, 5 and 6) form the second set of thresholds, namely the filter thresholds. The cardinality of the smaller of this set, m gives the number of thresholds, and the top m candidate thresholds are selected as the thresholds that separate the significant intensity levels of the image, In this case, m=3. The thresholds are accordingly filtered at filter function 212 to obtain the final threshold shown in the graph of 214, which then are used to segment the image in a multithresholding process to derive multiple versions of the document each containing information content as illustrated at 216a, 216b and 216c.

With reference now to FIG. 6, a functional block diagram is illustrated. The component elements may be hardware devices or circuits, or software modules executed on a programmed microprocessor. A scanned document image is initially stored in image buffer 300. Intensity histogram generator 302 generates a histogram signal H(i) mapping the population of image signals at each intensity level allowable within the system. Commonly, images are provided at 8 bits of gray, and accordingly allow 256 intensity levels of intensity. Color documents often represent multiples of 8 bits, with each separation forming the color document representable with 8 bit intensity values. Histogram H(i) is recursively thresholded at recursive threshold processor 304. The output of this processor are the threshold values and the goodness function.

Intensity transition histogram generator 306 generates a histogram signal E(i) mapping the population of intensity changes at each intensity change allowable within the system. Commonly, for an 8 bit image the maximum change would be 256 levels of intensity. Histogram E(i) is recursively thresholded at recursive threshold processor 308. The output of this processor are the filter threshold values and the goodness function.

The filter processor 310 operates to: 1) determine the number of significant thresholds through the cardinality of the threshold set and the filter threshold set (the number m), and 2) determine the m thresholds to be used based on the largest goodness value out of the threshold set.

Filter processor 310 passes the threshold to the thresholding circuit 312, for use in thresholding the stored scanned document image from image buffer 300.

It will no doubt be appreciated that the invention may be embodied in a general purpose computer or workstation, running in accordance with a preprogrammed routine. Embodiments of the invention have been implemented in the C language running on a Unix-based workstation.

It will no doubt be appreciated that the present invention may be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A document processing system, for converting scanned document signals received at n intensity levels where n is finite and small compared to the number of possible intensity levels, and a significant portion of the document is rendered at each intensity level, to a plurality of bimodal signals each retaining information content represented by the difference between two intensity levels, comprising:

a document signal input, receiving and storing scanned document signals at n intensity levels;

a programmable image processor operating on the stored scanned document signals to reduce n intensity levels to a bimodal signal, including:

an intensity histogram signal generator, responsive to a received image signal to generate a histogram mapping a population of intensity signals to each possible system intensity signal level;

an intensity transition histogram signal generator, responsive to a received image signal to generate a histogram mapping a population of changes in intensity signals between adjacent pixels to each possible change in system intensity signal level;

a thresholding processor, operating on each histogram signal to determine an optimum threshold level for the histogram represented thereby, said thresholding processor recursively operating on successively smaller portions of each histogram, the portions determined by a threshold value determined for a previous operation, if any, until a predetermined number of iterations is reached;

a filter operative on the threshold values to select a number thereof optimally converting scanned document signals received at n intensity levels to a plurality of bimodal signals each retaining information content represented by the difference between two intensity levels a thresholding circuit, receiving as inputs the stored scanned document signals at n intensity levels, comparing the signals to each threshold, and outputting a number of sets of signals, each set corresponding to one threshold level; and an output device, requiring bimodal signals.

2. A method of processing a scanned document image initially derived at n levels, where n is finite and small compared to the number of possible intensity levels, and a significant portion of the document is rendered at each intensity level, to reduce the image to 2 levels, while retaining information content therein, comprising the steps:

a. reaching a document image at an image buffer;

b. for the received image, generating an image intensity histogram signal H, mapping intensity signals populations in the scanned document image to possible system intensities;

c. determining threshold parameters for histogram signal H:
   1) with a discriminant analysis-based method, determining an optimum threshold for the histogram signal H,
   2) generating a goodness value as a function of the determined optimum threshold and the histogram signal,
   3) storing in association with the determined threshold a derived "goodness" value of the determined threshold;

d. using the previously determined threshold dividing histogram signal H into two sub histograms signals, and determining threshold parameters for each subhistogram signal:
   1) with a discriminant analysis-based method, determining an optimum threshold for the subhistogram signal,
   2) generating a goodness value as a function of the determined optimum threshold and the subhistogram signal,
   3) storing in association with the determined threshold a derived "goodness" value of the determined threshold;

e. repeating steps c and d for a predetermined number of iterations, each iteration further sub dividing each sub histogram;

f. selecting thresholds from the stored thresholds that have local maxima of goodness values and storing those thresholds as candidate thresholds;

g. for the received image, generating an image transition intensity histogram signal E, mapping intensity transition values populations in the scanned document image to possible system transitions;

h. determining threshold parameters for filter thresholds for histogram signal E:
   1) with a discriminant analysis-based method, determining an optimum filter threshold for the histogram signal E,
   2) generating a goodness value as a function of the determined optimum filter threshold and the histogram signal,
   3) storing in association with the determined filter threshold a derived "goodness" value of the determined threshold;

i. using the previously determined filter threshold, dividing, histogram signal H into two subhistograms signals, and determining threshold parameters for each filter subhistogram signal,
   1) with a discriminant analysis-based method, determining an optimum filter threshold for the filter subhistogram signal,
   2) generating a goodness value as a function of the determined optimum filter threshold and the filter subhistogram signal,
   3) storing in association with the determined filter threshold a derived "goodness" value of the determined threshold;

j. repeating steps h and i for a predetermined number of dynamically completed iterations, each iteration further sub dividing each sub histogram;

k. selecting filter thresholds from the stored filter thresholds that have local maxima of goodness values;

l. determining a number of thresholds m required for the scanned document image number by finding the cardinality of the smaller of the set of thresholds and set of filter thresholds;

m. selecting m thresholds from the set thresholds as the final thresholds based on their goodness values;

n. applying the selected m thresholds to the image to derive m+1 bilevel views of the scanned document image.

3. A method of processing a scanned document image initially derived at n levels, where n is finite and small compared to the number of possible intensity levels, and a significant portion of the document is rendered at each if intensity level, to reduce the image to a plurality of bilevel views, while retaining information content therein, comprising the steps:

a. receiving a document image at an image buffer;

b. for the received image, generating an image intensity histogram signal H, mapping intensity signals populations in the scanned document image to possible system intensities;

c. for the received image, generating an image transition intensity histogram signal E mapping intensity transition values populations in the scanned document stage to possible system transitions;

d. determining threshold parameters for histogram signal H:
  1) with a discriminant analysis-based method, determining an optimum threshold for the histogram signal H,
  2) generating a goodness value as a function of the determined optimum threshold and the histogram signal,
  3) storing in association with the determined threshold a derived "goodness" value of the determined threshold;
  4) using the determined threshold to subdivide histogram signal H into subhistograms, and iteratively repeating steps 1–4 for a predetermined number of iterations, thereby, generating a set of thresholds of signal H for each subhistogram generated;

e. determining threshold parameters for filter thresholds for histogram signal E:
  1) with a discriminant analysis-based method, determining an optimum filter threshold for the histogram signal E,
  2) generating a goodness value as a function of the determined optimum filter threshold and the histogram signal,
  3) storing in association with the determined filter threshold a derived "goodness" value of the determined threshold;
  4) using the determined threshold to subdivide filter histogram signal E into subhistograms, and iteratively repeating steps 1–4 a predetermined number of iterations, thereby generating a set of thresholds of signal E for each subhistogram generated;

f. determining a number of thresholds m, by finding the cardinality of the smaller of the set of thresholds of signal H and the set of thresholds for signal E;

g. selecting m thresholds from the set of thresholds as the final thresholds based or their goodness values;

h. applying the selected m thresholds to the image to derive m+1 bilevel views of the scanned document image.

* * * * *